(12) United States Patent
Shi

(10) Patent No.: US 10,679,633 B2
(45) Date of Patent: Jun. 9, 2020

(54) AUDIO PROCESSING DEVICE AND AUDIO PLAYBACK SYSTEM THEREOF

(71) Applicant: SHENZHEN CHUANGYUANTENG TECHNOLOGY CO., LTD., Shenzhen (CN)

(72) Inventor: Lichao Shi, Shenzhen (CN)

(73) Assignee: SHENZHEN CHUANGYUANTENG TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/043,173

(22) Filed: Jul. 24, 2018

(65) Prior Publication Data
US 2020/0005800 A1 Jan. 2, 2020

(30) Foreign Application Priority Data
Jun. 28, 2018 (CN) .......................... 2018 1 0690672

(51) Int. Cl.
*G10L 19/008* (2013.01)
*G10L 19/16* (2013.01)
*H04W 4/80* (2018.01)
*H04S 1/00* (2006.01)

(52) U.S. Cl.
CPC .......... *G10L 19/008* (2013.01); *G10L 19/167* (2013.01); *H04S 1/007* (2013.01); *H04W 4/80* (2018.02)

(58) Field of Classification Search
CPC ...... G10L 19/008; G10L 19/167; H04W 4/80; H04W 4/33; H04S 1/007; G06F 3/165
See application file for complete search history.

(56) References Cited

U.S. PATENT DOCUMENTS

| 9,904,508 B1* | 2/2018 | Drinkwater | G06F 3/165 |
| 2009/0236140 A1* | 9/2009 | Randall | H01R 13/03 |
| | | | 174/268 |
| 2019/0179597 A1* | 6/2019 | Tull | G06F 3/165 |

OTHER PUBLICATIONS

Cirrus Logic Products Selection, Jul. 2017, Cirrus Logic, pp. 1-3 of the PDF document (Year: 2017).*
Bose, SoundTouch Wireless Adapter, 2016, Bose Corporation, pp. 1-2, 10, 12-13 of the PDF document (Year: 2016).*

* cited by examiner

*Primary Examiner* — Fan S Tsang
*Assistant Examiner* — David Siegel

(57) ABSTRACT

The present disclosure is provided an audio processing device and an audio playback system thereof. The audio processing device includes a receiving module configured to receive an audio signal and identify a transmission mode of the audio signal, with the transmission mode at least including a Bluetooth transmission mode and a WIFI transmission mode; a processing module configured to decode the audio signal into an analog audio signal and a digital audio signal; an output module configured to receive the analog audio signal and the digital audio signal and then output the analog audio signal to a conventional audio via an AUX analog output port and output the digital audio signal to an HiFi audio via an optical fiber output port. The present disclosure can receive audio signals with different transmission types and output the audio signals of different types, which enriches audio selectivity and is of high interest.

3 Claims, 6 Drawing Sheets

AUDIO PROCESSING DEVICE AND AUDIO PLAYBACK SYSTEM THEREOF

BACKGROUND

1. Technical Field

The present disclosure generally relates to audio processing technologies field, and especially relates to an audio processing device and an audio playback system thereof.

2. Description of Related Art

With development of modern electrical devices, the combination of the network and electrical products can enable people to obtain more and more abundant resources. However, with development of the electrical technology, what we need is to integrate the functions of different electrical products to achieve a convenient operation. A current link between the network and electrical products is limited to a same city or a same region. So, there is also a great development space in realizing remote control of electrical products and network resources. The remote control should be first realized in order to obtain the integration of electrical products, network resources and hardware equipments. Therefore, it is imperative to realize a connection of an electrical product (such as a cell phone) to a remote network resource by a certain technology and to achieve control of the hardware (e.g. mobile hard disk) remotely connected to a router.

SUMMARY

The technical problems to be solved: in view of the shortcomings of the related art, the present disclosure relates to an audio processing device and an audio playback system thereof which can solve the shortcomings of the related art and receive audio signals with different transmission types and output the audio signals of different types so as to enrich audio selectivity and be of high interest.

The technical solution adopted for solving technical problems of the present disclosure is:

An audio processing device includes a receiving module configured to receive an audio signal and identify a transmission mode of the audio signal, with the transmission mode at least including a Bluetooth transmission mode and a WIFI transmission mode; a processing module configured to decode the audio signal into an analog audio signal and a digital audio signal; an output module configured to receive the analog audio signal and the digital audio signal and then output the analog audio signal to a conventional audio via an AUX analog output port and output the digital audio signal to an HiFi audio via an optical fiber output port.

Wherein the audio processing device further includes a control circuit connected to the receiving module, the control circuit includes a channel switch and an indicator light to connect different transmission modes for transmitting the audio signals, one or more signal transmission channels with the different transmission modes are controlled to be in a transmission state by the channel switch and the indicator light being in the transmission state is controlled to emit light.

Wherein the processing module further includes an analog audio decoding chip WM8978 and a digital audio decoding chip CS8406 so as to decode the audio signal transmitted by the Bluetooth transmission mode or the WIFI transmission mode into the analog audio signal and the digital audio signal.

Wherein the receiving module is configured to transmit the audio signal to the analog audio decoding chip WM8978 and the digital audio decoding chip CS8406 of the processing module via an I2S transmission mode.

Wherein the audio processing device further includes a power supply module connected to the receiving module, the processing module and the output module and configured to provide 5V-1A power supply for the audio processing device.

Wherein the receiving module is configured to identify whether the transmission mode of the audio signal is the Bluetooth transmission mode or the WIFI transmission mode via an identification code carried by the audio signal, when the receiving module receives the audio signal.

Wherein during identifying the identification code carried by the audio signal, when the identification code is 0, the audio signal is identified to transmit by the Bluetooth transmission mode and the channel switch corresponding to the Bluetooth transmission mode is controlled to open and light a corresponding indicator light, while when the identification code is 1, the audio signal is identified to transmit by the WIFI transmission mode and the channel switch corresponding to the WIFI transmission mode is controlled to open and light a corresponding indicator light.

Wherein the audio processing device further includes an optimization module connected between the receiving module and the processing module and configured to adjust the frequency of the audio signal for further optimization.

An audio playback system according to an exemplary embodiment of the present disclosure includes an audio processing device, a conventional audio connected to an AUX analog output port of the audio processing device, and an HiFi audio connected to an optical fiber output port of the audio processing device. The audio processing device includes a receiving module configured to receive an audio signal and identify a transmission mode of the audio signal, with the transmission mode at least including a Bluetooth transmission mode and a WIFI transmission mode; a processing module configured to decode the audio signal into an analog audio signal and a digital audio signal; an output module configured to receive the analog audio signal and the digital audio signal and then output the analog audio signal to a conventional audio via the AUX analog output port and output the digital audio signal to an HiFi audio via the optical fiber output port.

Wherein a WIFI signal transmission channel of the receiving module is a two-channel WIFI signal output channel.

The present disclosure provides the advantages as below.

Distincting from the related art, the structure of the present disclosure is provided a receiving module configured to receive an audio signal and identify a transmission mode of the audio signal, with the transmission mode at least including a Bluetooth transmission mode and a WIFI transmission mode; a processing module configured to decode the audio signal into an analog audio signal and a digital audio signal; an output module configured to receive the analog audio signal and the digital audio signal and then output the analog audio signal to a conventional audio via an AUX analog output port and output the digital audio signal to an HiFi audio via an optical fiber output port. Therefore, the present disclosure can receive audio signals with different transmission types and output the audio signals of different types, which enriches audio selectivity and is of high interest.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

Figure 1:
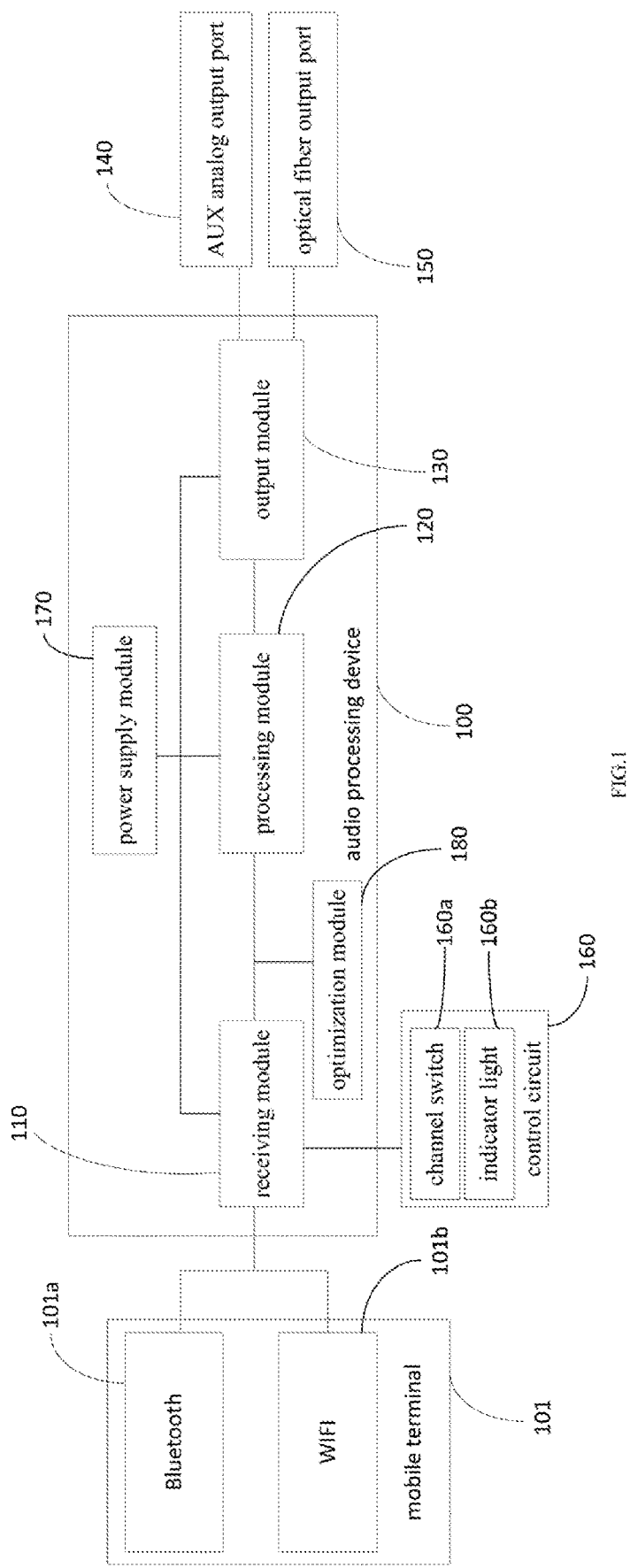
FIG. 1 is a schematic view of the audio processing device in accordance with an exemplary embodiment.

The disclosure is illustrated by way of example and not by way of limitation in the figures of the accompanying drawings, in which like reference numerals indicate similar elements.

Referring to FIG. 1, FIG. 1 is a schematic view of the audio processing device 100 in accordance with an exemplary embodiment. The audio processing device 100 includes a receiving module 110 configured to receive an audio signal and identify a transmission mode of the audio signal. The transmission mode at least includes a Bluetooth transmission mode and a WIFI transmission mode.

a processing module 120 configured to decode the audio signal into an analog audio signal and a digital audio signal;

an output module 130 configured to receive the analog audio signal and the digital audio signal and then output the analog audio signal to a conventional audio via an AUX analog output port 140 and output the digital audio signal to an HiFi audio via an optical fiber output port 150.

Preferably, the audio processing device 100 further includes a control circuit 160 connected to the receiving module 110. The control circuit 160 includes a channel switch 160a and an indicator light 160b to connect different transmission modes for transmitting the audio signals, one or more signal transmission channels with different transmission modes are controlled to be in a transmission state by the channel switch 160a and the indicator light 160b being in the transmission state is controlled to emit light.

Preferably, the processing module 120 further includes an analog audio decoding chip WM8978 and a digital audio decoding chip CS8406 so as to decode the audio signal transmitted by the Bluetooth transmission mode or the WIFI transmission mode into the analog audio signal and the digital audio signal.

Preferably, the receiving module 110 is configured to transmit the audio signal to the analog audio decoding chip WM8978 and the digital audio decoding chip CS8406 of the processing module 120 through an I2S transmission mode.

Preferably, the audio processing device 100 further includes a power supply module 170 connected to the receiving module 110, the processing module 120 and the output module 130 and configured to provide 5V-1A power supply for the audio processing device 100. The circuit diagram of the audio processing device 100 is shown in FIG. 3.

Figure 3:
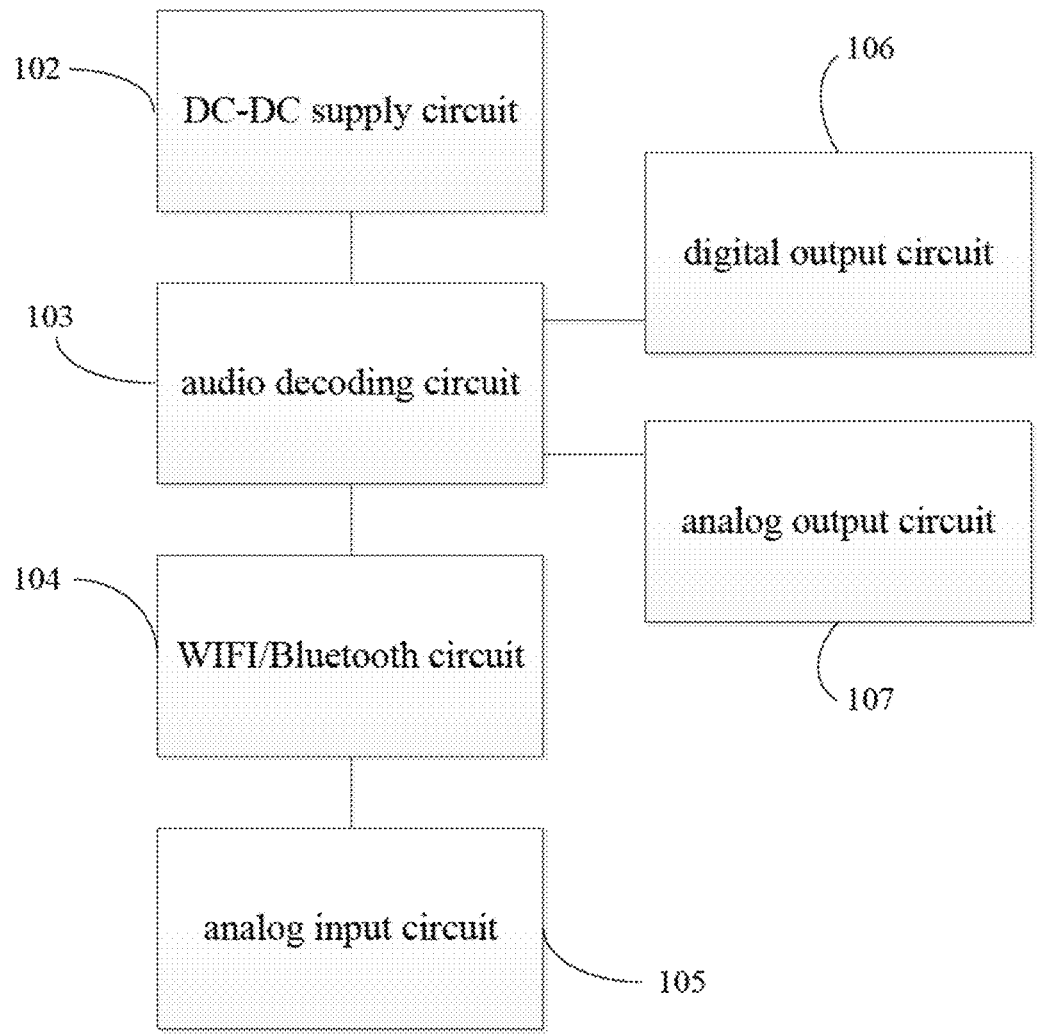
FIG. 3 is a circuit diagram of the audio processing device of FIG. 1.

Referring to FIG. 3, the audio processing device 100 includes a DC-DC power supply circuit 102, an audio decoding circuit 103, a WIFI/Bluetooth circuit 104, an analog input circuit 105, a digital output circuit 106 and an analog output circuit 107. The audio decoding circuit 103 is electrically connected to all of the DC-DC power supply circuit 102, the WIFI/Bluetooth circuit 104, the digital output circuit 106 and the analog output circuit 107. The WIFI/Bluetooth circuit 104 is also electrically connected to the analog input circuit 105.

The DC-DC power supply circuit 102 is configured to provide 5V-1A power supply for the audio processing device 100. The audio decoding circuit 103 is mainly consisted of two audio decoding chips, one is the analog audio decoding chip MW8978 and the other one is the digital audio decoding chip CS8406. The analog audio decoding chip MW8978 and the digital audio decoding chip CS8406 respectively parse the audio data stream into an analog signal and a digital signal output, and both the two chips support EQ regulation. As long as a corresponding instruction is received, the chip can adjust the frequency of the audio data stream. The WIFI/Bluetooth circuit 104 can receive the audio data stream through a WIFI channel or a Bluetooth channel and then transmit it to the audio decoding circuit 103 through an I2S line. The audio decoding circuit 103 also includes the analog audio decoding chip MW8978 and the digital audio decoding chip CS8406. The analog audio decoding chip MW8978 and the digital audio decoding chip CS8406 are configured to respectively decode the audio data stream transmitted from the WIFI/Bluetooth circuit 104 into a corresponding analog signal and a corresponding digital signal output. The analog audio signal is output to the analog output circuit 107, and the analog output circuit 107 is then connected to a conventional audio through the AUX analog output port 140 to play music. While the digital audio signal is output to the digital output circuit 106, and the digital output circuit 106 is then connected to an HiFi audio through the optical fiber output port 150.

Preferably, the receiving module 110 is configured to identify whether the transmission mode of the audio signal is the Bluetooth transmission mode or the WIFI transmission mode via an identification code carried by the audio signal, when the receiving module 110 receives the audio signal.

Preferably, during identifying the identification code carried by the audio signal, when the identification code is 0, the audio signal is identified to transmit by the Bluetooth transmission mode and the channel switch 160a corresponding to the Bluetooth transmission mode is controlled to open and light a corresponding indicator light 160b. While when the identification code is 1, the audio signal is identified to transmit by the WIFI transmission mode and the channel switch corresponding to the WIFI transmission mode is controlled to open and light a corresponding indicator light.

Preferably, the audio processing device 100 further includes an optimization module 180 connected between the receiving module 110 and the processing module 120 and configured to adjust the frequency of the audio signal for further optimization.

Figure 4:
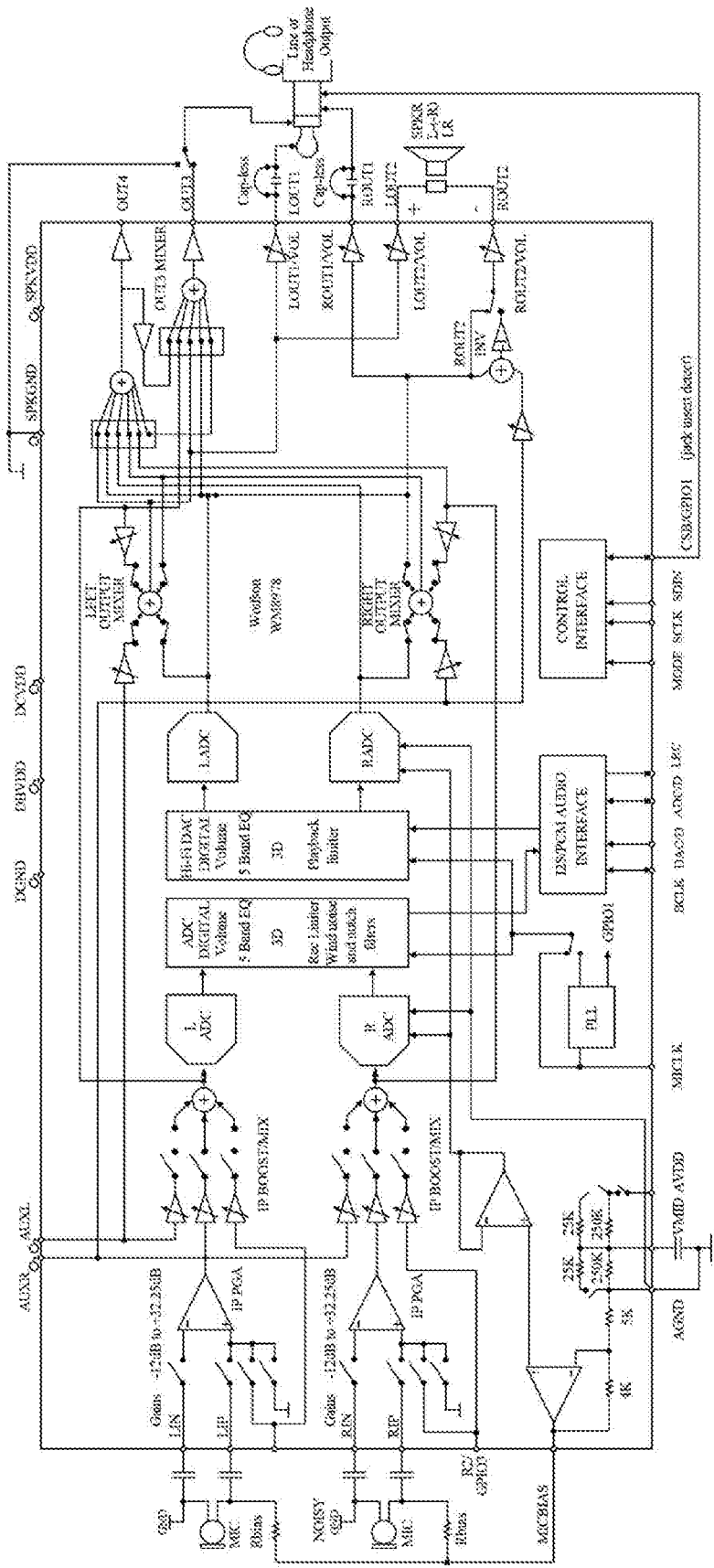
FIG. 4 is a circuit diagram of a chip WM8978 used in the audio processing device of FIG. 1.

The audio processing device 100 of the present disclosure based on the chip WM8978 is provided for processing signals. The circuit diagram of the chip WM8978 is shown in FIG. 4. The chip WM8978 is a low power, high quality stereo codec designed for portable applications such as digital still cameras or digital camcorders. The chip WM8978 integrates preamps for stereo differential mics, and includes drivers for speakers, a headphone and a differential or stereo line output. External component requirements are reduced as no separate microphones or headphone amplifiers are required. An advanced on-chip digital signal processing function includes a 5-band equaliser, a mixed signal automatic level control for the microphone or line input through the ADC as well as a purely digital limiter function for record or playback. Additional digital filtering options are available in the ADC path, to cater for application filtering such as "wind noise reduction". The WM8978 Codec can be operated as a master or a slave. An internal PLL can generate all required audio clocks for the Codec from common reference clock frequencies, such as 12 MHz and 13 MHz. The pins of the chip WM8978 are shown in the following table:

| PIN | NAME | TYPE | DESCRIPTION |
| --- | --- | --- | --- |
| 1 | LIP | Analog | Left Mic Pre-amp positive input |
| 2 | LIN | input | Left Mic Pre-amp negative input |
| 3 | L2/GPIO2 | | Left channel line input/secondary mic pre-amp positive input/GPIO pin |
| 4 | RIP | Analog | Right Mic Pre-amp positive input |
| 5 | RIN | input | Right Mic Pre-amp negative input |
| 6 | R2/GPIO3 | | Right channel line input/secondary mic pre-amp positive input/GPIO pin |
| 7 | LRC | Digital | DAC and ADC Sample Rate Clock |
| 8 | BCLK | input | Digital Audio Port Clock |
| 9 | ADCDAT | Digital output | ADC Digital Audio Data Output |
| 10 | DACDAT | Digital | DAC Digital Audio Data Input |
| 11 | MCLK | input | Master Clock Input |
| 12 | DGND | Supply | Digital ground |
| 13 | DCVDD | | Digital core logic supply |
| 14 | DBVDD | | Digital buffer (I/O) supply |
| 15 | CSB/GPIO1 | Digital input | 3-Wire MPU Chip Select/General purpose input/output 1 |
| 16 | SCLK | | 3-Wire MPU Clock Input/2-Wire MPU Clock Input |
| 17 | SDIN | | 3-Wire MPU Data Input/2-Wire MPU Data Input |
| 18 | MODE | Digital input | Control Interface Selection (ground, 2-Wire control mode: I2C mode) |
| 19 | AUXL | Analog | Left Auxiliary input |
| 20 | AUXR | input | Right Auxiliary Input |
| 21 | OUT4 | Analog output | Buffered midrail Headphone pseudo-ground, or Right line output or MONO mix output |
| 22 | OUT3 | | Buffered midrail Headphone pseudo-ground, or Left line output |
| 23 | ROUT2 | | Second right output, or BTL speaker driver positive output |
| 24 | SPKGND | Supply | Speaker ground (feeds speaker amp and OUT3/OUT4) |
| 25 | LOUT2 | Analog output | Second left output, or BTL speaker driver negative output |
| 26 | SPKVDD | Supply | Speaker supply (feed speaker amp only) |
| 27 | VMID | Reference | Decoupling for ADC and DAC reference voltage |
| 28 | AGND | Supply | Analog ground (feeds ADC and DAC) |
| 29 | ROUT1 | Analog | Headphone Output Right |
| 30 | LOUT1 | output | Headphone Output Left |
| 31 | AVDD | Supply | Analog supply (feeds ADC and DAC) |
| 32 | MICBIAS | Analog output | Microphone Bias |

Furthermore, it includes the following registers:

1. Register R0 configured to reset the chip WM8978;

2. Register R1 mainly configured to set BIASEN (bit 3), this bit is set to 1, thereby the amplifier of the analog part working to hear the sound;

3. Register R2 configured to output 1 enable;

4. Register R3 configured to output 2 enable, enable left and right channel DAC, and enable left and right channel mixer, etc;

5. Register R4 configured to set an effective digit of audio data, 00 for 16-bit audio, 10 for 24-bit audio and I2S audio data format (mode), we usually set it to I2S format, that is a philips mode;

6. Register R6 configured to set whether MCLK, BCLK, and the chip WM8978 work in a primary mode or a slave mode, etc;

7. Registers R10 and R14 configured to close the mute, ADC and DAC oversample rates;

8. Registers R50 and R51 configured to set a DAC output to access left and right channel mixers;

9. Registers R52, R53, R54, and R55 configured to set an output volume of headphones and speakers;

10. Register R49 configured to set to open an overheat protection mode;

11. Register R45, R46, R47 and R48 configured to set MIC gains.

Figure 5:
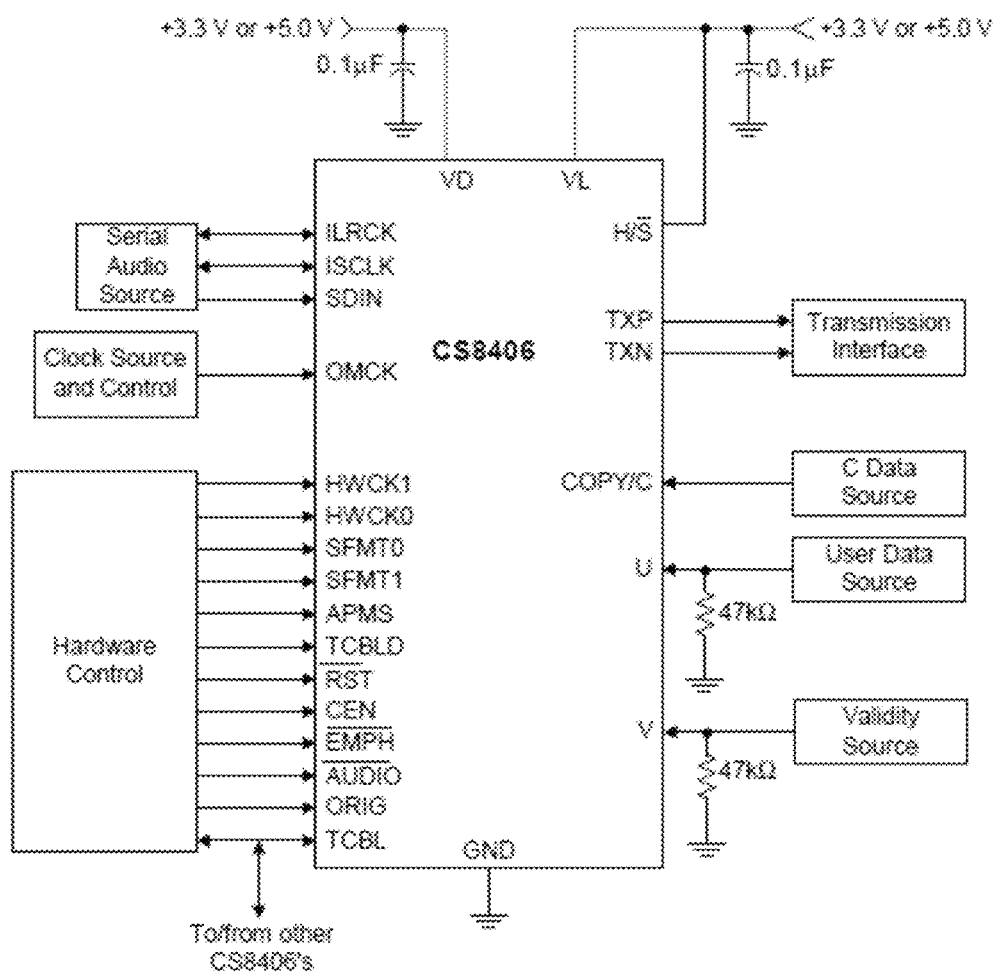
FIG. 5 is a circuit diagram of a chip digital audio transmitter CS8406 used in the audio processing device of FIG. 1.

Furthermore, a format code and a transmission of a digital audio is done by the digital audio transmitter CS8406. The digital audio transmitter CS8406 can support 192 kHz sampling rates and satisfy a next-generation audio format, and receive and encode audio data and digital data and then transmit it to a cable/fiber interface after multiplexing and coding it. The circuit diagram of the digital audio transmitter CS8406 is shown in FIG. 5. In addition, the chip CS8406 can receive the audio signal through a TXP/TXN interface, and then encode the audio signal, and finally output it through a V interface and a U interface.

Figure 6:
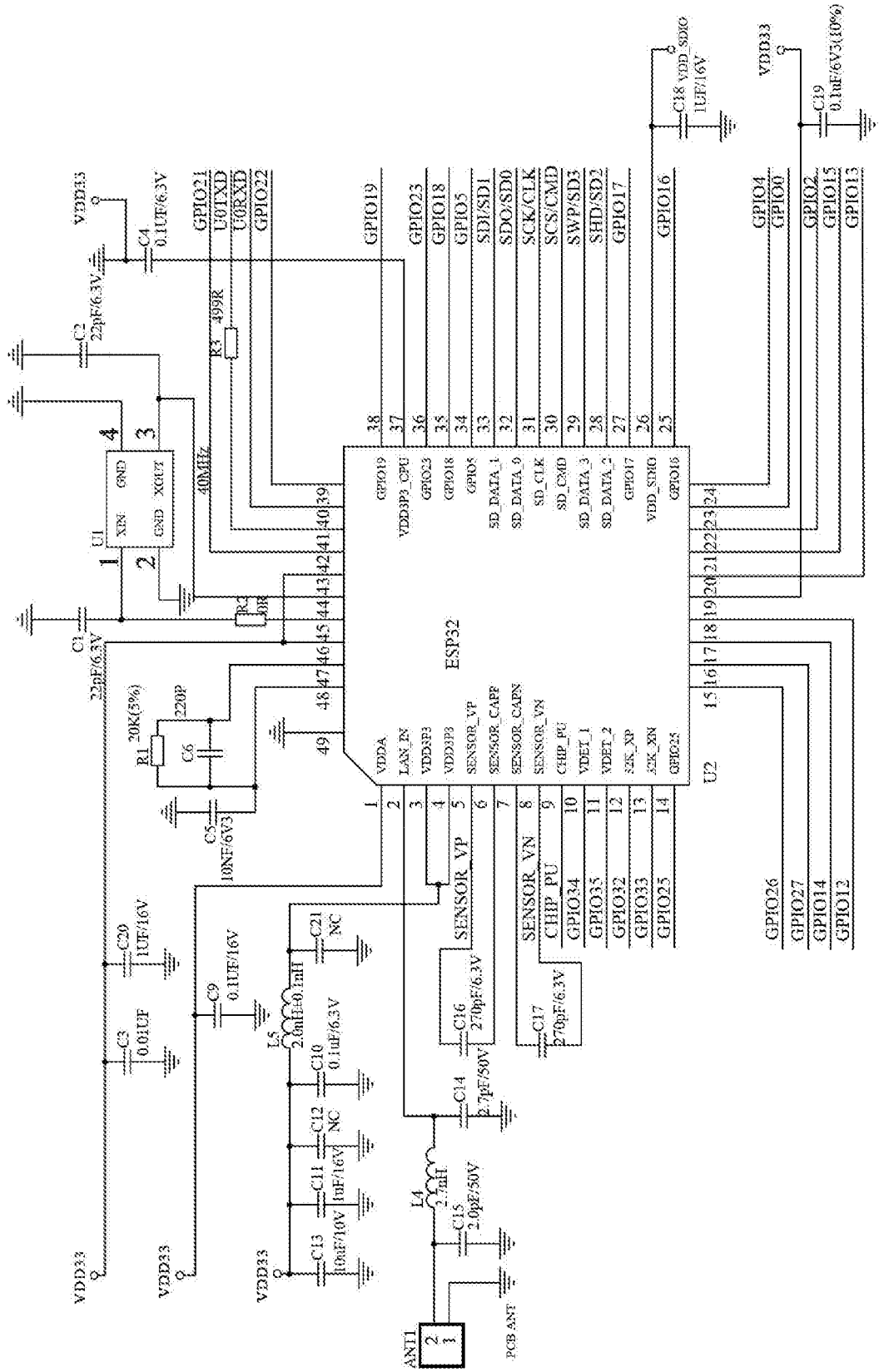
FIG. 6 is a circuit diagram of a chip ESP32 used in the audio processing device of FIG. 1.

The Bluetooth and WIFI transmissions are completed by a chip ESP32. The chip ESP32 can support a SmartConfig mode and a Bluetooth networking mode and integrate a 2.4 GHz WIFI and a Bluetooth-dual-mode single chip solution. Bluetooth protocols are open and easy to extend, of high security and require a password to establish a connection. At the same time, in the case where the router can't normally work, data transmission can be performed by the Bluetooth, and then the audio signal of a mobile terminal can be transmitted to the chip CS8406 shown above for audio coding. The circuit diagram of the chip ESP32 is shown in FIG. 6 and the pin definitions of the chip ESP32 are shown in the following table:

| Name | Serial Number | Function |
|---|---|---|
| GND | 1 | Ground |
| 3V3 | 2 | Power Supply |
| EN | 3 | Enable Chip, High Level On |
| SENSOR_VP | 4 | GPI36, SENSOR_VP, ADC_H, ADC1_CH0, RTC_GPIO0 |
| SENSOR_VN | 5 | GPI39, SENSOR_VN, ADC1_CH3, ADC_H, RTC GPIO3 |
| IO34 | 6 | GPI34, ADC1 CH6, RTC GPIO4 |
| IO35 | 7 | GPI35, ADC1 CH7, RTC GPIO5 |
| IO32 | 8 | GPIO32, XTAL_32K_P (32.768 kHz crystal oscillator input), ADC1 CH4, TOUCH9, RTC GPIO9 |
| IO33 | 9 | GPIO33, XTAL_32K_N (32.768 kHz crystal oscillator output), ADC1 CH5, TOUCH8, RTC GPIO8 |
| IO25 | 10 | GPIO25, DAC_1, ADC2_CH8, RTC_GPIO6, EMAC_RXD0 |
| IO26 | 11 | GPIO26, DAC_2, ADC2_CH9, RTC_GPIO7, EMAC_RXD1 |
| IO27 | 12 | GPIO27, ADC2_CH7, TOUCH7, RTC_GPIO17, EMAC RX DV |
| IO14 | 13 | GPIO14, ADC2_CH6, TOUCH6, RTC_GPIO16, MTMS, HSPICLK, HS2_CLK, SD_CLK, EMAC TXD2 |
| IO12 | 14 | GPIO12, ADC2_CH5, TOUCH5, RTC_GPIO15, MTDI, HSPIQ, HS2_DATA2, SD_DATA2, EMAC TXD3 |
| GND 1 | 5 | Ground |
| IO13 | 16 | GPIO13, ADC2_CH4, TOUCH4, RTC_GPIO14, MTCK, HSPID, HS2_DATA3, SD_DATA3, EMAC_RX_ER |
| SHD/SD2 | 17 | GPIO9, SD_DATA2, SPIHD, HS1_DATA2, U1RXD |
| SWP/SD3 | 18 | GPIO10, SD DATA3, SPIWP, HS1 DATA3, U1TXD |
| SCS/CMD | 19 | GPIO11, SD CMD, SPICS0, HS1 CMD, U1RTS |
| SCK/CLK | 20 | GPIO6, SD CLK, SPICLK, HS1 CLK, U1CTS |
| SDO/SD0 | 21 | GPIO7, SD DATA0, SPIQ, HS1 DATA0, U2RTS |
| SDI/SD1 | 22 | GPIO8, SD DATA1, SPID, HS1 DATA1, U2CTS |
| IO15 | 23 | GPIO15, ADC2_CH3, TOUCH3, MTDO, HSPICS0, RTC_GPIO13, HS2_CMD, SD_CMD, EMAC_RXD3 |
| IO2 | 24 | GPIO2, ADC2_CH2, TOUCH2, RTC_GPIO12, HSPIWP, HS2_DATA0, SD DATA0 |
| IO0 | 25 | GPIO0, ADC2_CH1, TOUCH1, RTC_GPIO11, CLK OUT1, EMAC TX CLK |
| IO4 | 26 | GPIO4, ADC2_CH0, TOUCH0, RTC_GPIO10, HSPIHD, HS2_DATA1, SD DATA1, EMAC TX ER |
| NC | 27 | — |
| NC | 28 | — |
| IO5 | 29 | GPIO5, VSPICS0, HS1_DATA6, EMAC_RX_CLK |
| IO18 | 30 | GPIO18, VSPICLK, HS1_DATA7 |
| IO19 | 31 | GPIO19, VSPIQ, U0CTS, EMAC_TXD0 |
| NC | 32 | — |
| IO21 | 33 | GPIO21, VSPIHD, EMAC TX EN |
| RXD0 | 34 | GPIO3, U0RXD, CLK OUT2 |
| TXD0 | 35 | GPIO1, U0TXD, CLK OUT3, EMAC RXD2 |
| IO22 | 36 | GPIO22, VSPIWP, U0RTS, EMAC TXD1 |
| IO23 | 37 | GPIO23, VSPID, HS1_STROBE |
| GND | 38 | Ground |
| GND | 39 | Ground |

Figure 2:
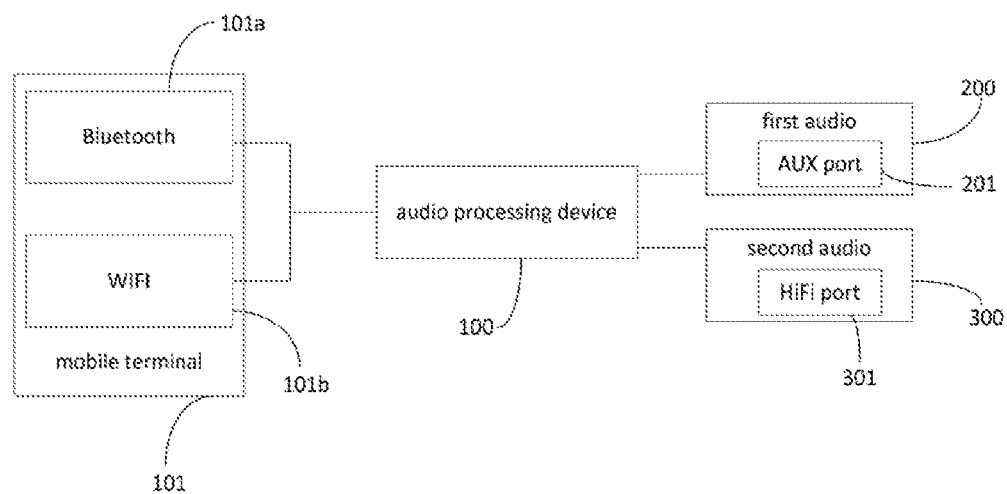
FIG. 2 is a schematic view of the audio playback system in accordance with an exemplary embodiment.

Furthermore, an audio playback system with the audio processing device 100 is provided in FIG. 2. The audio playback system includes the audio processing device 100 mentioned above. At the same time, an AUX analog output port 140 of the audio processing device 100 is connected to a first audio 200, and an optical fiber output port 150 of the audio processing device 100 is connected to a second audio 300. In the audio playback system, the receiving module 110 of the audio processing device 100 is connected a mobile terminal 101 with a WIFI connection 101b and a Bluetooth connection 101a for processing the audio data and controlling an audio playback mode. A conventional speaker is to upgrade a voice-activated WIFI/Bluetooth speaker, which can play music without manual operation.

In an exemplary embodiment of the present disclosure, the first audio 200 is an audio with an AUX port 201 therein, and the second audio 300 is an HiFi audio with an HiFi port 301 therein.

Specifically, the audio processing device 100 further includes a WIFI/Bluetooth module (not shown) to establish a connection with the mobile terminal 101 through the one-key network allocation instruction of an APP. According to the instructions of the mobile terminal APP, it can connect to a home WIFI router or a Bluetooth of a mobile phone. At the same time, the WIFI Bluetooth module can send EQ adjustment instructions to the audio decoding chip through 12S for adjusting frequencies of the audio data stream. When the audio playback system is connected to the home WIFI network, the mobile terminal 101 is concurrently connected to the WIFI network time as well. At this time, users can push music of a music software to the audio playback system through the DLNA function of the mobile terminal 101, the music is analyzed by the audio processing device 100 and then output to a corresponding audio output port, finally an EQ adjustment instruction through the mobile terminal 101 is accessed to adjust the EQ. Meanwhile, users can connected to the audio playback system via a Bluetooth under a no-WIFI condition, songs in the mobile phone or the mobile phone network are pushed to the audio playback system through the DLNA function of the mobile phone and then output by connecting the audio playback system to an audio.

The WIFI/Bluetooth module of the present disclosure is provided as a main control body to realize one keying network, an EQ adjustment and a scene mode switching function through using the mobile terminal APP. In addition, the audio playback system can support a variety of audio data output modes, such as an HiFi output, a digital signal audio output and an analog signal audio output.

Specifically, the mobile terminal 101 is connected to the WIFI transmission mode or the Bluetooth transmission mode of the audio playback system to send EQ adjustment instructions. In a command packet transmitted by the mobile terminal 101, a bit of is set to distinguish between the WIFI and the Bluetooth network. In this way, the mobile terminal 101 detects whether there is a WIFI 101b connection or not, and if so, positioning a command word as 1; if not, the mobile terminal 101 continues detecting whether there is a Bluetooth 101a connection or not, if so, positioning the command word as 2. Otherwise, positioning the command word as 0 if no network is found. When the audio playback system receives data with a bit of 0, the indicator light 160b may turn red. In addition, EQ adjustment instructions also send a corresponding data packet to the audio playback system, the audio playback system passes the EQ adjustment instructions to an audio decoding circuit to analyze the corresponding instructions and adjust frequencies of the audio data stream after the audio playback system receiving the instructions.

With adopting the coexistence of WIFI and Bluetooth, the audio processing device of the present disclosure is connected to a conventional audio via an audio cable to upgrade the conventional audio as a two-in-one WIFI/Bluetooth audio. The mobile terminal 101 is connected to the audio playback system via the WIFI 101b or the Bluetooth 101a so that a WIFI data channel is established with the audio playback system via a DLNA function or an Airplay function of the mobile terminal 101, or a Bluetooth data channel is established with the audio playback system via a Bluetooth function of the mobile terminal 101. After that, music in the mobile terminal 101 can be pushed to the audio playback system through the DLNA/Airplay and Bluetooth connections, and the music is played in the audio through an audio output port of the audio playback system connecting to an audio input port of the audio by a connection cable.

Furthermore, the optical fiber output port 150 of the audio playback system is configured to support a playback of HiFi sound quality and connect to a professional HiFi audio equipment, with an audio sampling rate supporting 48 kHz, a signal-to-noise ratio greater than/equal to 100, a dynamic range greater than/equal to 100 dB, a distortion less than 0.01%, 300 Mbps transmission broadband, and non-destructive transmission of audio signals.

Distincting from the related art, the audio processing device of the present disclosure is provided a receiving module configured to receive an audio signal and identify a transmission mode of the audio signal, with the transmission mode at least including a Bluetooth transmission mode and a WIFI transmission mode; a processing module configured to decode the audio signal into an analog audio signal and a digital audio signal; an output module configured to receive the analog audio signal and the digital audio signal and then output the analog audio signal to a conventional audio via an AUX analog output port and output the digital audio signal to an HiFi audio via an optical fiber output port. Therefore, the present disclosure can receive audio signals with different transmission types and output the audio signals of different types, which enriches audio selectivity and is of high interest.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An audio processing device comprising:
a receiving module configured to receive an audio signal and identify a transmission mode of the audio signal, the transmission mode at least comprising a Bluetooth transmission mode and a WIFI transmission mode;
a processing module configured to decode the audio signal into an analog audio signal and a digital audio signal;
an output module configured to receive the analog audio signal and the digital audio signal and then output the analog audio signal to a conventional audio output via an AUX analog output port and output the digital audio signal to an HiFi audio output via an optical fiber output port;
wherein the audio processing device further comprises a control circuit connected to the receiving module, the control circuit comprises a channel switch and an indicator light to connect different transmission modes for transmitting the audio signal, one or more signal transmission channels with the different transmission modes are controlled to be in a transmission state by the channel switch and the indicator light being in the transmission state is controlled to emit light.

2. The audio processing device as claimed in claim 1, wherein the receiving module is configured to identify whether the transmission mode of the audio signal is the Bluetooth transmission mode or the WIFI transmission mode via an identification code carried by the audio signal, when the receiving module receives the audio signal.

3. The audio processing device as claimed in claim 2, wherein during identifying the identification code carried, by the audio signal, when the identification code is 0, the audio signal is identified to transmit by the Bluetooth transmission mode and the channel switch corresponding to the Bluetooth transmission mode is controlled to open and light a corresponding indicator light, while when the identification code is 1, the audio signal is identified to transmit by the WIFI transmission mode and the channel switch corresponding to the WIFI transmission mode is controlled to open and light a corresponding indicator light.

* * * * *